United States Patent [19]

Schmidle et al.

[11] Patent Number: 4,686,539

[45] Date of Patent: Aug. 11, 1987

[54] MULTIPULSING METHOD FOR OPERATING AN INK JET APPARATUS FOR PRINTING AT HIGH TRANSPORT SPEEDS

[76] Inventors: Lisa M. Schmidle, 39 Hillside Rd., Southbury, Conn. 06488; Stuart D. Howkins, 29 Farrar La., Ridgefield, Conn. 06877

[21] Appl. No.: 873,263

[22] Filed: Jun. 6, 1986

Related U.S. Application Data

[63] Continuation of Ser. No. 710,296, Mar. 11, 1985, abandoned.

[51] Int. Cl.[4] .............................................. G01D 15/18

[52] U.S. Cl. ................................ 346/1.1; 346/140 R

[58] Field of Search .......................... 346/1.1, 140 PD

[56] References Cited

U.S. PATENT DOCUMENTS

| | | | |
|---|---|---|---|
| 4,104,646 | 8/1978 | Fischbeck | 346/140 PD |
| 4,491,851 | 1/1985 | Mizuno et al. | 346/140 PD X |
| 4,503,444 | 3/1985 | Tacklind | 346/140 PD |
| 4,513,299 | 4/1985 | Lee et al. | 346/140 PD |
| 4,523,200 | 6/1985 | Howkins | 346/140 PD X |
| 4,523,201 | 6/1985 | Liker | 346/140 PD X |

*Primary Examiner*—George H. Miller, Jr.

[57] ABSTRACT

A method for both reducing the ligament length and satellite droplet problems associated with producing high velocity ink droplets from an ink jet head printing at relatively high ink jet head transport speeds, comprises driving the ink jet head with a composite waveform including independent and successive first, second, and third electrical pulses, each having an exponential leading edge and a step-like trailing edge, the pulses being constructed to have amplitudes, pulse widths, and dead times between pulses, for causing the ink jet head to eject three successive ink droplets, each of increased velocity relative to the preceding droplet, for causing the droplets to merge in flight fo form a single or ultimate droplet having a predetermined velocity.

9 Claims, 12 Drawing Figures

MULTIPULSING METHOD FOR OPERATING AN INK JET APPARATUS FOR PRINTING AT HIGH TRANSPORT SPEEDS

This application is a continuation of application Ser. No. 710,296, filed 3/11/85, now abandoned.

FIELD OF THE INVENTION

The field of the present invention relates generally to ink jet apparatus, and more specifically, to a method for operating an ink jet apparatus for printing at relatively high transport speeds with relatively high droplet velocity.

BACKGROUND OF THE INVENTION

In general, bar code printers and drafting mode printers must operate at high printhead transport speeds. A printhead transport speed, U, will magnify dot placement errors caused by channel to channel variations, $\Delta V$, in the ink droplet velocity V. This may be expressed as:

$$\Delta x=(Ud/V^2)\Delta V \quad (1)$$

where $\Delta X$ is the dot placement error and d is the distance between the printhead and the printing medium. Also, for some printing applications, it is necessary to maintain a large printhead distance, d, which also magnifies dot placement errors. In general, equation (1) shows that increasing the jet velocity V will reduce $\Delta x$. It has also been observed that increasing V decreases the component of dot placement error resulting from misaim of a jet. In general therefore, when an ink jet printer is applied for in use as a bar code or draft mode printer, it is necessary to eject the ink droplets at relatively high velocities. The velocity will depend upon the print quality required i.e. the maximum dot placement error that can be tolerated. Typically, however, it will be in excess of 4.0 meters per second and less than 20 meters per second, in order to accommodate printhead transport speeds typically in excess of 10 inches per second and ranging up to 100 inches per second, relative to the print medium.

A major problem recognized by the present inventors is that when ink droplets of required high velocity for producing the quality of printing required for bar codes, for example, are ejected, the droplets tend to have relatively long ligaments trailing behind the main droplet. The ligaments reduce the quality of printing, in that they tend to break up and cause splatter printing of unwanted spurious dots on the print medium, and/or the ligaments may cause a distortion in the individual dots printed on the print medium. Accordingly, to provide necessary printing quality when using an ink jet head, for bar code and draft mode printers, it is required that the ink jet head be operated in a manner to reduce the length of the ligaments of individual ink droplets to a point where the remaining ligament does not affect the quality of printing. The present inventors also recognized the importance of insuring that the ultimate ink droplet or droplets used to print upon the print medium all have substantially the same predetermined velocity, in order to obtain close control over the printing operation.

Waveshaping techniques have been used in the prior art in order to provide control over various aspects of the operation of an ink jet printer, as will be discussed in greater detail below. For example, in Mizuno et al U.S. Pat. No. 4,491,851, a first pulse is applied to an ink jet device to initiate the ejection of an ink droplet, followed by application of a second pulse to push the "tail" of the droplet out of the nozzle and into the main droplet, thereby substantially reducing the length of the "tail" and preventing satellite droplet formation. Mizuno, and other prior art to be discussed later, do not address or even allude towards the present method for operating an ink jet printhead to avoid the problems recognized by the present inventors.

SUMMARY OF THE INVENTION

In order to overcome the problems in the prior art, the present inventors discovered a method for driving an ink jet printhead with a composite waveform including independent and successive first, second and third electrical pulses, whereby the relative amplitudes, pulse widths, and delay times between pulses, are predetermined for causing the printheat to eject successively higher velocity first, second and third ink droplets, respectively, to cause the droplets to merge in flight for producing an ultimate ink droplet having a predetermined velocity V for printing on the print medium. The composite waveform is also adjusted for either minimizing the length of the ligament of the ultimate ink droplet or for randomly fragmenting the ligament, thereby insuring close control over the printing operation and required quality of printing.

BRIEF DESCRIPTION OF THE DRAWINGS

In the drawing, wherein like items have common reference designations.

DESCRIPTION OF THE PREFERRED EMBODIMENT

Figure 1:
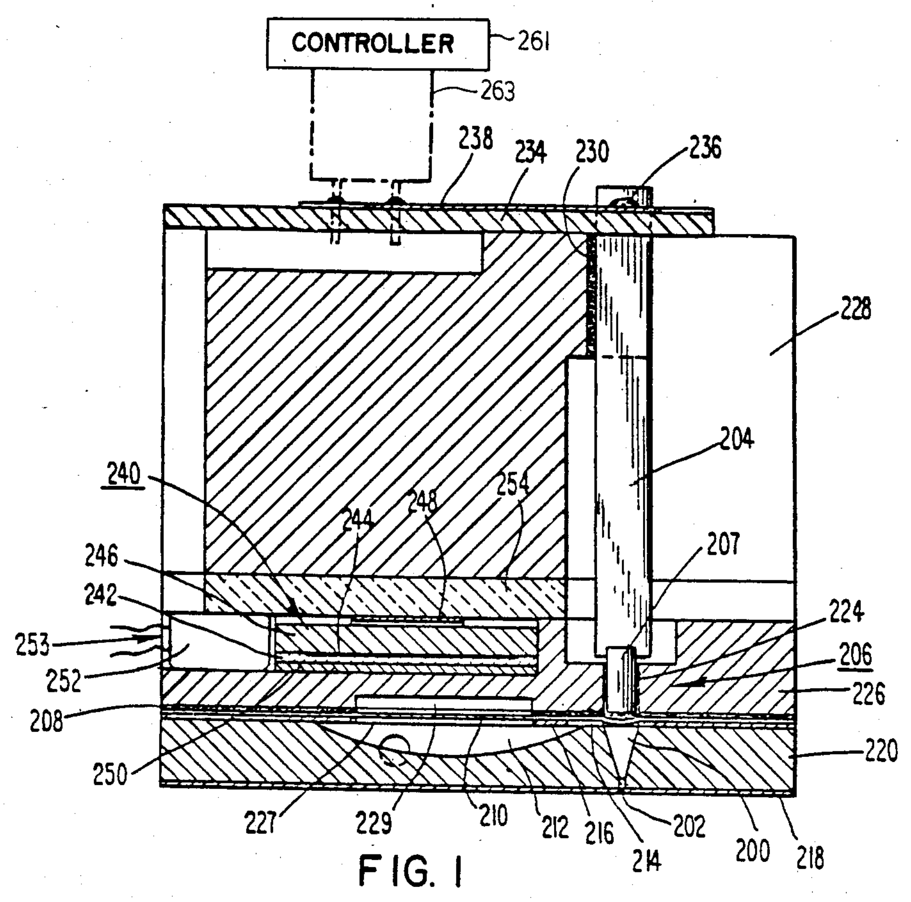
FIG. 1 is a sectional view of an illustrated ink jet apparatus.
Figure 2:
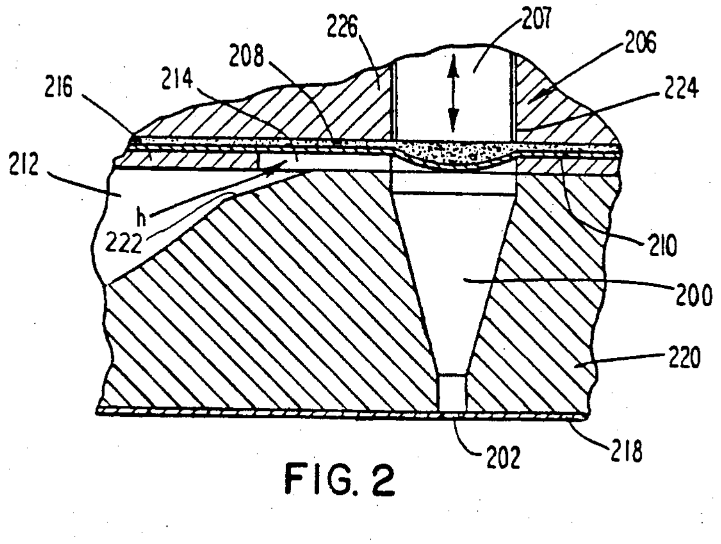
FIG. 2 is an enlarged view of a portion of a section of FIG. 1.
Figure 3:
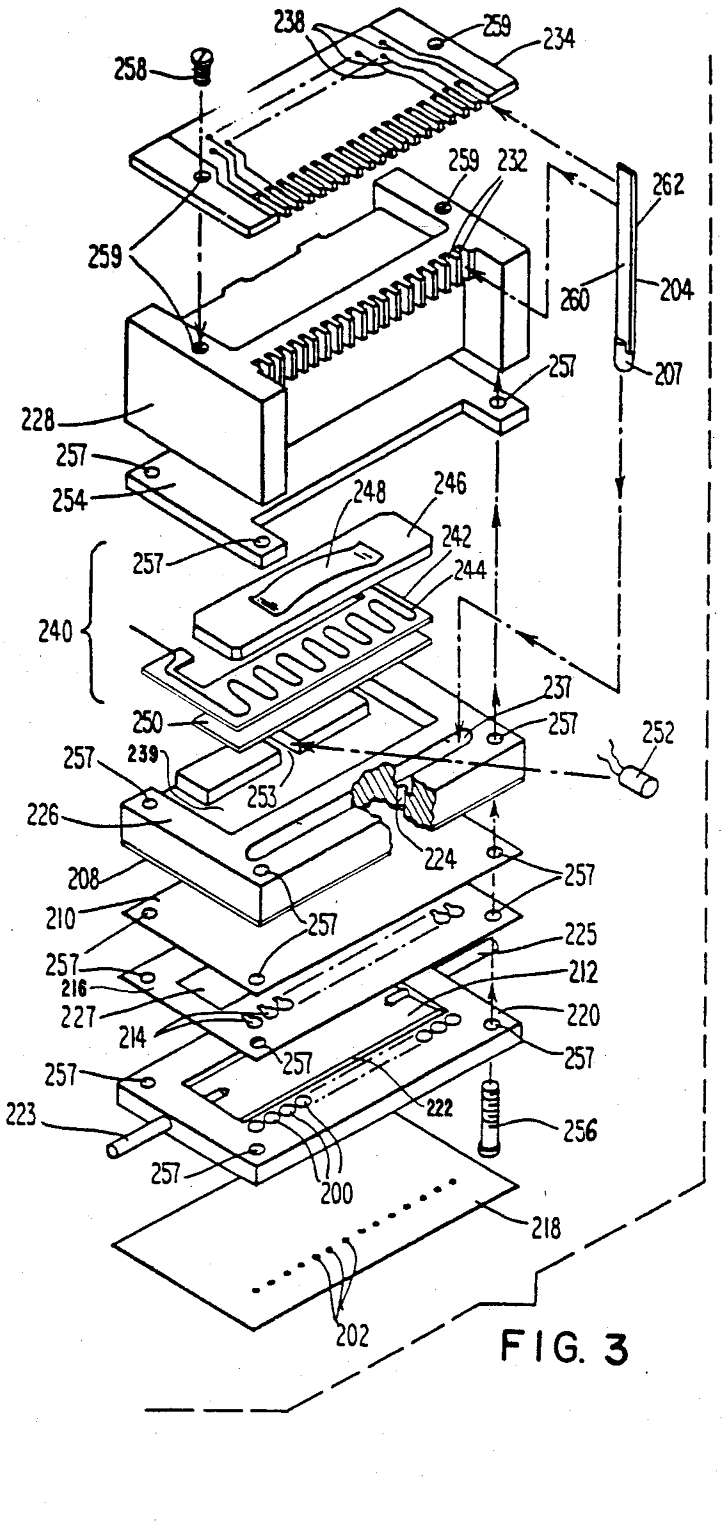
FIG. 3 is an exploded projectional or pictorial view of the, ink jet apparatus, including the embodiments shown in FIGS. 1 and 2.

In FIGS. 1-3, an ink jet apparatus of co-pending application Ser. No. 600,785, filed Apr. 16, 1984, for "Improved Ink Jet Method and Apparatus" is shown (the invention thereof is assigend to the assignee of the present invention), and incorporated herein by reference. The present invention was discovered during development of improved methods for operating an ink jet apparatus which was a modified version of the previously mentioned ink jet apparatus for use in applications such as bar code and drafting mode printing. However, the ink jet apparatus discussed herein is presented for purposes of illustration of the method of the present invention, it is not meant to be limiting. Also, only the basic mechanical features and operation of this apparatus are discussed in the following paragraphs, and reference is made to the previously mentioned application for greater details concerning this apparatus. The reference designations used in FIGS. 1–3 are substantially the same as used in the co-pending application, in order to facilitate any referencing back to that application or the patent that may issue therefrom.

With reference to FIGS. 1–3, the illustrative ink jet apparatus includes a chamber 200 having an orifice 202 for ejecting droplets of ink in resposne to the state of energization of a transducer 204 for each jet in an array of such jets (see FIG. 3). The transducer 204 expands and contracts (in directions indicated by the arrows in FIG. 2) along its axis of elongation, and the movement is coupled to the chamber 200 by coupling means 206 which includes a foot 207, a visco-elastic material 209 juxtaposed to the foot 207, and a diaphragm 210 which is reloaded to the position shown in FIGS. 1 and 2. In the modified version of the ink jet apparatus used, the visco-elastic material 208 and the diaphragm 210 were eliminated and coupling was achieved directly from the foot 208 to the ink. In this modification the gap between the foot and the guide hole 224 was sealed with a visco-elastic material to prevent ink leakage back into the transducer area. This modification, however, is not relevant to the present invention and the methods described would work equally well with or without the modification.

Ink flows into the chamber 200 from an unpressurized reservoir 212 through restricted inlet means provided by a restricted opening 214. The inlet 214 comprises an opening in a restrictor plate (see FIG. 3). As shown in FIG. 2, the reservoir 212 which is formed in a chamber plate 220 includes a tapered edge 222 leading into the inlet 214. As shown in FIG. 3, the reservoir 212 is supplied with a feed tube 223 and a vent tube 225. The reservoir 212 is compliant by virtue of the diaphragm 210, which is in communication with the ink through a large opening 227 in the restrictor plate 216 which is juxtaposed to an area of relief 229 in the plate 226.

One extremity of each one of the transducers 204 is guided by the cooperation of a foot 207 with a hole 224 in a plate 226. As shown, the feet 207 are slideably retained within the holes 224. The other extremities of each one of the transducers 204 are compliantly mounted in a block 228 by means of a compliant or elastic material 230 located in slots 232 (see FIG. 3) so as to provide support for the other extremities of the transducers 204. Electrical contact with the transducers 204 is also made in a compliant manner by means of a compliant printed circuit 234, which is electrically coupled to suitable means such as solder 236 to an electrode 260 of the transducers 204. Conductive patterns 238 are provided on the printed circuit 234.

The plate 226 (see FIGS. 1 and 3) includes holes 224 at the base of a slot 237 which receive the feet 207 of the transducers 204, as previously mentioned. The plate 226 also includes receptacle 239 for a heater sandwich 240, the latter including a heater element 242 with coils 244, a hold down plate 246, a spring 248 associated with the plate 246, and a support plate 250 located immediately beneath the heater 240. The slot 253 is for receiving a thermistor 252, the latter being used to provide control of the temperature of the heater element 242. The entire heater 240 is maintained within the receptacle in the plate 226 by a cover plate 254.

As shown in FIG. 3, the variously described components of the ink jet apparatus are held together by means of screws 256 which extend upwardly through openings 257, and screws 258 which extend downwardly through openings 259, the latter to hold a printed circuit board 234 in place on the plate 228. The dashed lines in FIG. 1 depict connections 263 to the printed circuits 238 on the printed circuit board 234. The connections 263 connect a controller 261 to the ink jet apparatus, for controlling the operation of the latter.

In conventional operation of the ink jet apparatus, the controller 261 is programmed to at an appropriate time, via its connection to the printed circuits 238, apply a voltage to a selected one or ones of the hot electrodes 260 of the transducers 204. The applied voltage causes an electric field to be produced transverse to the axis of elongation of the selected transducers 204, causing the transducers 204 to contract along their elongated axis. When a particular transducer 204 so contracts upon energization, the portion of the diaphragm 210 located below the foot 207 of the transducer 204 moves in the direction of the contracting transducer 204, thereby effectively expanding the volume of the associated chamber 200. As the volume of the particular chamber 200 is so expanded, a negative pressure is initially created within the chamber, causing ink therein to tend to move away from the associated orifice 202, while simultaneously permitting ink from the reservoir 212 to flow through the associated restricted opening or inlet 214 into the chamber 200. The amount of ink that flows into the chamber 200 during the refill is greater than the amount that flows back out through the restrictor 214 during firing. The time between refill and fire is not varied during operation of the jet thus providing a "fill before fire" cycle. Shortly thereafter, the controller 261 is programmed to remove the voltage or drive signal from the particular one or ones of the selected transducers 204, causing the transducer 204 or transducers 204 to very rapidly expand along their elongated axis, whereby via the visco-elastic material 208, and the feet 207, the transducers 204 push against the rest of the diaphragm 210 beneath them, causing a rapid contraction or reduction of the volume of the associated chamber or chambers 200. In turn, this rapid reduction in the volume of the associated chambers 200, creates a pressure pulse or positive pressure disturbance within the chambers 200, causing an ink droplet to be ejected from the associated orifices 202. Not that when a selected transducer 204 is so energized, it both contracts or reduces its length and increases its thickness. However, the increase in thickness is of no consequence to the illustrated ink jet apparatus, in that the changes in length of the transducer control the operation of the individual ink jets of the array. Also note, that with present technology, by energizing the transducers for contraction along their elongated axis, accelerated aging of the transducers 204 is avoided, and in extreme cases, depolarization is also avoided.

Figure 4:
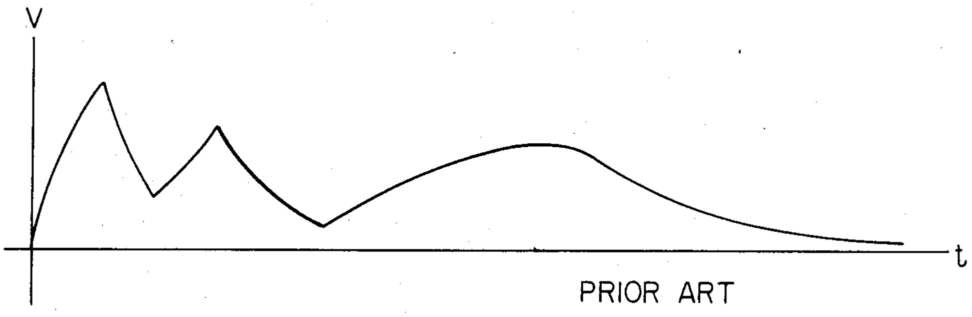
FIGS. 4 through 7 each show various waveforms used in the prior art for obtaining desired operation of an ink jet printhead.

In Kyser U.S. Pat. No. 4,393,384, he teaches the composite waveform of FIG. 4, herein, for use in dampening out undesirable oscillation in operating an ink jet printhead. As shown, the composite waveform of Kyser substantially includes three successive pulse-like waveforms, but these waveforms are not independent of one another, and are combined to produce a composite waveform that has analog characteristics. Also, Kyser does not teach the use of a plurality of pulses in a composite waveform for driving an ink jet printhead to eject successive ink droplets, respectively. As mentioned, Kyser's use of more than one pulse in his composite waveform is to dampen out undesirable oscillation.

Figure 5:
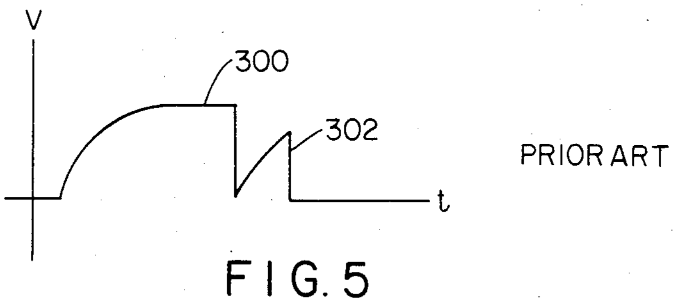

Another "Method for Operating an Ink Jet Apparatus" is disclosed in co-pending U.S. Ser. No. 453,571, filed on Dec. 27, 1982, and assigned to the same assignee as the present invention. With reference to FIG. 5 herein, a typical waveform used in a method embodiment disclosed in this co-pending application is shown. The ink jet apparatus of FIGS. 1–3 ejects an ink droplet in response to termination of pulse 300. The second appearing pulse 302 causes the ink droplet break-off earlier from the orifice of the associated ink jet printhead then would otherwise occur in the absence of pulse 302. In this manner, stable operation of the jet is achieved through the suppression of certain failure mechanisms which would otherwise limit the operation of the printhead particularly for high frequencies and high jet or ink droplet velocities. Improved aiming of the jet results from high jet velocity 30, accordingly, improved placement of the ink droplets for high frequency ink jet printing is obtained.

Figure 6:
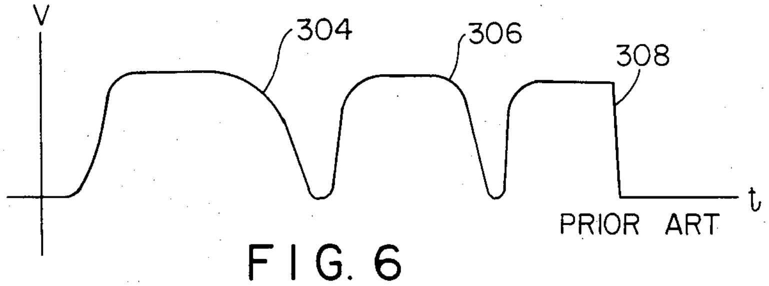

In Liker U.S. application Ser. No. 453,295, filed on Dec. 27, 1982, and co-pending herewith (also assigned to the same assignee as the present invention), for "A Method For Operating an Ink Jet Apparatus", a multipulsing technique is taught. FIG. 6 is a typical composite waveform used in the Liker application. The individual pulses 304, 306 and 308 are constructed for operating the ink jet apparatus of FIGS. 1–3 to eject three successive ink droplets, respectively. The droplets have equal or higher or lower velocities, or some combination thereof, relative to one another, for merging either in flight or upon striking a recording medium.

Figure 7:
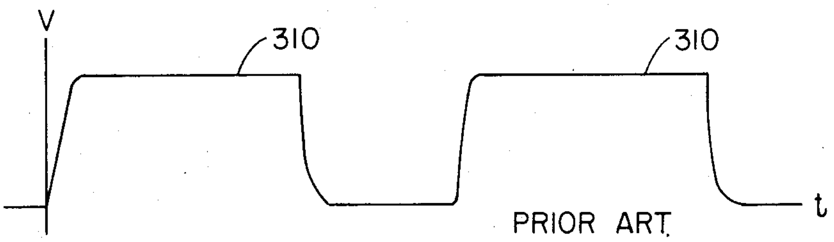

In FIG. 7, the composite waveform shown is taught in co-pending U.S. Ser. No. 600,785, filed Apr. 16, 1984, for "Method For Selective Multi-cycle Resonant Operation of an Ink Jet Apparatus For Controlling Dot Size" (assigned to the same assignee as the present invention). The patentees for this application, William J. DeBonte and Stephen J. Liker, teach operation of the ink jet apparatus of FIGS. 1–3, for example, via application of a train of pulses 310 having a periodicity equivalent to the dominant resonant frequency of the ink jet apparatus. Each pulse 310 of the pulse train causes an ink droplet of substantially predictable volume to be ejected. A given number of successive pulses 310 are applied each printing cycle to the ink jet apparatus for causing an equal number of ink droplets to be ejected for controlling the boldness of the dot being printed.

Figure 8:
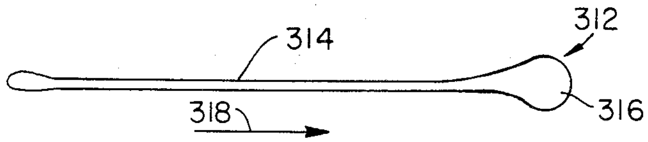
FIG. 8 shows a typical ink droplet with an elongated ligament obtained during high droplet velocity operation of an ink jet printhead.
Figure 9:
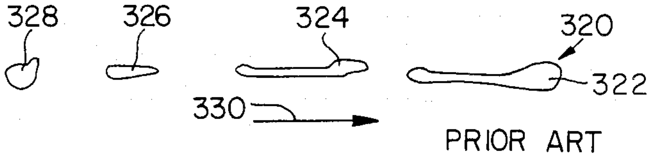
FIG. 9 shows a typical high velocity ink droplet having a trailing ligament that has broken up into a plurality of satellite droplets.
Figure 11:
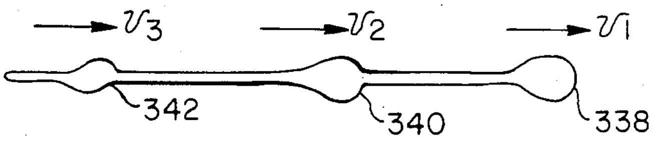
FIG. 11 shows typical ink droplets in early flight as produced by driving an ink jet printhead with the composite waveform of FIG. 10.

In FIG. 8, a typical ink droplet ejected at a relatively high velocity in excess of 4.0 meters per second, is shown to have a substantially long trailing ligament 314. The direction of flight of droplet 312 is indicated by arrow 318. Also, a head 316 of droplet 312 may be irregularly shaped. Such high velocity ink droplets may also have their ligaments break apart in flight, forming a series of satellite ink droplets trailing behind the main droplet. Such a breakup of a droplet 320 having a main droplet 322 trailed by a succession of satellite droplets 324, 326 and 328, all traveling in the direction of arrow 330, is shown in FIG. 9.

Figure 10:
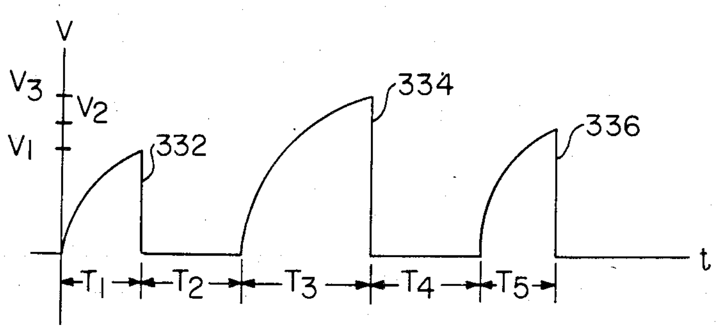
FIG. 10 shows a composite waveform of the preferred embodiment of the invention.

The present inventors discovered that the waveform of FIG. 10, when used to drive ink jet apparatus or printhead, such as that of FIGS. 1–3, for example, substantially overcomes the problems in the prior art. In the preferred embodiment of the invention, the pulse width $T_1$ of pulse 332 is made less than the pulse width $T_3$ of pulse 334, and the amplitude $V_1$ of pulse 332 is made less than the amplitude $V_3$ of pulse 334. Pulse 336 typically may have its amplitude $V_2$ and pulse width $T_5$ adjusted for optimizing the shape and velocity of the "ultimate ink droplet" produced, as will be described. The delay times $T_2$ and $T_4$ between pulses 332 and 334, and 334 and 336, respectively, are also tailored for optimizing operation of the ink jet apparatus. For example, $T_1$, $T_4$, and $T_5$ may be on the order of 10 microseconds, whereas $T_2$ may be 5 microseconds, and $T_3$ may be 13 microseconds. The amplitudes $V_1$, $V_2$ and $V_3$ and time periods $T_1$ through $T_5$, must obviously be determined relative to one another for obtaining a desired operation of a particular ink jet apparatus. Similarly, the shapes of pulses 332, 334, and 336 may be altered or optimized in the operation of a particular ink jet apparatus. In this example, pulses 332, 334, 336 have an exponential leading edge. Ideally, the trailing edges should be as close to a step-function as possible.

Figure 12:
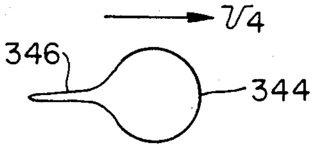
FIG. 12 shows a typical "ultimate droplet" produced by the merger in flight of the droplets shown in FIG. 11.

In this example, when the waveform of FIG. 10 is used to drive the ink jet apparatus of FIGS. 1–3, ink droplets 338, 340, and 342, may be ejected at successively higher velocities $v_1$, $v_2$ and $v_3$, respectively. The relative velocities between the droplets 338, 340 and 342 are such that they merge in flight to form an ultimate droplet 344 at predetermined velocity $v_4$ as shown in FIG. 12. Note that the ultimate droplet 344 is substantially spherical in shape, for providing printing of a substantially circular dot upon a printing medium. Also not that the ligament 346 trailing droplet 344 is substantially short in length and may be fragmented. Although the mechanism is not completely understood, it is believed that the following droplets 340 and 342 collect satellite droplets as they catch up and merge with the lead or first ejected droplet 338, thereby forming the ultimate droplet 344. It has also been observed that the last trailing droplet 342 may have trailing or slower velocity satellites (a randomly broken up ligament) which later form the ligament 346 and may cause small dots invisible to the naked eye to be printed to one side of the dot formed by the ultimate droplet 344 on the print medium.

In summary of the method of the present invention, one form of the composite waveform of FIG. 10 may be constructed to minimize the length of the ligament or tail of the "ultimate droplet" 344 ejected from the ink jet printhead or apparatus. Previously, in the prior art, shorter ligament lengths were typically achieved by reducing the ejection velocity of the droplets. The present invention avoids the necessity of reducing the ejection velocity of the droplets, via appropriate selection of the values of the pulse widths and time between pulses of pulses 332, 334 and 336 of FIG. 10, for example. In this manner, ligament length of the ultimate droplet 344 not only is shortened, but may also be broken up to satellite droplets which arrive at the print medium in an incoherent manner, causing random splatter on the print medium that is invisible to the naked eye. The parameters chosen for the composite waveform of FIG. 10 that achieve the highest degree of incoherence in the break up of the ligament 346 of the ultimate droplet 344, may not necessarily be the same parameters that satisfy absolute minimum ligament length obtainment. Optimum values of the parameters, pulse widths, dead times, and amplitudes, for achieving a desired quality of printing can be determined empirically, and often involve a compromise. The optimum values would, in general, depend upon specific details of the design of the ink jet transducer and fluidic sections because of the various resonant frequencies and the associated damping coefficients involved.

Also, it is important to note that by dynamically varying the number of pulses used in the composite waveform to drive the ink jet apparatus in the method of the present invention, grey scale control can be achieved. By appropriate adjustment of the parameters of the multipulses, using the method of the present invention, the velocity of the ultimate droplet produced can be made independent of the number of pulses used in the composite waveform to cause the ink jet apparatus to produce multiple droplets which form the ultimate droplet, as previously described. Also, control of the amplitude of the individual pulses of the composite waveform can be used within a range to control the volume of the individual ink droplets ejected by respective pulses, thereby controlling the volume of the "ultimate droplet" produced by a merger of the individual droplets in flight. The present inventor also noted that the method of the present invention permits the jetting or relatively high viscosity inks (typically 10 to 30 centipoise) at moderate to high print speeds (typically at transport speeds ranging from 6 to 100 inches per second), and ink droplet velocity ranging from 4 meters per second to 20 meters per second, for printing with a resolution of up to 480 dots per inch.

Although particular embodiments of the present inventive method for operating an ink jet apparatus have been disclosed, other embodiments which fall within the true spirit and scope for the appended claims may occur to those of ordinary skill in the art.

What is claimed is:

1. A method for driving an ink jet head to eject ink droplets which combine to produce drops of ink on a print medium, said method comprising the steps of:

producing and applying to said head a composite drive waveform having, for each drop, at least first, second and third electrical pulses with waveshapes, pulse widths, amplitudes and dead times therebetween for ejecting from said ink jet head respective first, second and third ink droplets having successively higher velocities upon exit from said head; and selecting said first pulse to have both a pulse width and pulse amplitude each less than the respective pulse width and pulse amplitude of said second pulse whereby said droplets merge in flight for producing an ultimate ink drop having a predetermined velocity V, thereby permitting printing at velocities in excess of 4.0 meters per second, with ink jet head transport speeds up to and exceeding 50 inches per second.

2. The method of claim 1, further comprising the step of:

adjusting the relative amplitudes and pulse widths between said first through third electrical pulses, and the dead time between said first and second, and second and third electrical pulses, for reducing to a minimum the length of the ligament of said ultimate ink drop, thereby substantially reducing the deleterious effect upon printing quality caused by said ligament.

3. The method of claim 1 further comprising the step of:

adjusting the relative amplitudes and pulse widths between said first through third electrical pulses, and the dead times between said first and second, and second and third electrical pulses, for breaking up a ligament of said ultimate ink drop into an incoherent stream of small satellites, thereby improving the quality of printing.

4. The method of claim 1 further comprising the step of:

selecting the relative amplitudes, pulse widths, and dead times between said first through third electrical pulses, for both shortening the length of a ligament of said ultimate ink drop, and for breaking up the shortened ligament into an incoherent stream of small satellites, thereby improving the quality of printing.

5. The method of claims 1, 2, 3 or 4 further comprising the step of shaping said first, second, and third electrical pulses to each have an exponential leading edge, and a step-like trailing edge.

6. The method of claim 1 and further comprising the steps of:

shaping said first electrical pulse to have an exponential leading edge and a step-like trailing edge; and selecting said dead times between said first and second pulses and between said second and third pulses relative to said pulse widths so as to permit three droplets to merge to form each said drop.

7. The method of claim 6 wherein:

said dead times between said first and second pulses and said second and third pulses are unequal.

8. The method of claim 6 wherein said amplitude and duration and said second pulse are greater than corresponding parameters of said first and third pulses.

9. The method of claim 1 wherein:

said amplitude and duration of said second pulse are greater than corresponding parameters of said first and third pulses.

* * * * *